United States Patent [19]
Fischer et al.

[11] Patent Number: 5,726,258
[45] Date of Patent: Mar. 10, 1998

[54] CONTINUOUS PREPARATION OF POLYMERS

[75] Inventors: Wolfgang Fischer, Ludwigshafen; Michael Baumgärtel, Frankenthal, both of Germany

[73] Assignee: BASF Aktiengesellschaft, Ludwigshafen, Germany

[21] Appl. No.: 671,308

[22] Filed: Jul. 1, 1996

[30] Foreign Application Priority Data

Jul. 3, 1995 [DE] Germany ............... 195 24 182.7

[51] Int. Cl.⁶ .................................................. C08F 2/02
[52] U.S. Cl. .................... 526/64; 526/68; 526/88; 526/347; 526/347.2
[58] Field of Search .................. 526/64, 347, 347.2, 526/68, 88

[56] References Cited

U.S. PATENT DOCUMENTS

| | | | |
|---|---|---|---|
| 4,061,848 | 12/1977 | Sistig et al. | 526/61 |
| 4,501,865 | 2/1985 | Koenig et al. | 526/71 |

FOREIGN PATENT DOCUMENTS

| | | |
|---|---|---|
| 519 266 | 12/1992 | European Pat. Off. |
| 25 04 659 | 8/1976 | Germany . |
| 32 37 076 | 4/1984 | Germany . |
| 34 30 247 | 2/1986 | Germany . |
| 273 265 | 11/1989 | Germany . |
| 273265 | 11/1989 | Germany . |
| 294 429 | 10/1991 | Germany . |

OTHER PUBLICATIONS

Ullmann's Encyclopedia, fifth vo. A 21.
Ullmanns Encyklopadie der technischen Chem, Band 19.
Influence of Segregation of Molecular Weight . . . . I & E C Fundamentals, vol. 5, No. 3, Aug. 1966.

*Primary Examiner*—Thomas R. Weber
*Attorney, Agent, or Firm*—Keil & Weinkauf

[57] ABSTRACT

A process for the continuous preparation of polymers from reaction components, in particular of copolymers of styrene and acrylonitrile, by bulk or solution polymerization, where the reaction components are passed through the tubes of a recycle reactor, the recycle reactor has at least one tube bundle reactor with straight tubes around which a liquid heat-transfer medium flows, and each tube bundle reactor consists of at least two shell and tube heat exchangers which are connected together by at least one intermediate mixing section. Moreover the volume of the shell and tube heat exchangers is at least 50% of the total volume of the arrangement. The intermediate mixing sections consist of tubes with static mixing elements, around which tubes a heat-transfer medium flows.

13 Claims, 2 Drawing Sheets

CONTINUOUS PREPARATION OF POLYMERS

BACKGROUND OF THE INVENTION

1. Field of the Invention

The invention relates to a process and an apparatus for the continuous preparation of polymers from reaction components, in particular of copolymers of styrene and acrylonitrile, by bulk or solution polymerization, wherein the reaction components are passed through the tubes of a recycle reactor.

2. Description of the Related Art

The polymerization of, for example, acrylonitrile with vinylaromatic compounds such as styrene, α-methylstyrene, vinyltoluene and the like, with or without the use of free-radical initiators, in a stirred vessel is known. In such cases, the heat of reaction can be removed either through the wall or by evaporative or reflux cooling (DE 34 30 247, DE 32 37 076, DE 25 04 659), but this is possible in the case of copolymerization of vinylaromatics and acrylonitrile by this process only when the conversions are not too high and in the presence of relatively large amounts of inert solvents, because of the relatively high viscosities which otherwise occur and cannot be dealt with. The conversion must also not be too high because when the conversions are higher in continuous stirred vessels the resulting products have wider molecular weight distributions (cf. Z. Tadmor, Ind. Eng. Chem. Fundam. 5 (1966) 336, and G. Gerrens, Polymerisationstechnik, Ullmans Encyklopädie der technischen Chemie, 4th edition, Verlag Chemie, Weinheim, 1980, 107 et seq.). Since, as a rule, the unreacted monomers and the solvent are returned to the reactor for economic reasons, in such cases a low conversion is disadvantageous, especially since it also leads to relatively low space-time yields. The stirred vessels developed to improve removal of heat and to deal with highly viscous polymer solutions are very technically elaborate (DD 273 265, DD 294 429) and thus very costly.

Polymerization in tubular reactors is likewise known in principle (EP 519 266). These reactors may also at the same time have a large s specific cooling area to remove the relevant heat of reaction, which is a precondition for high space-time yields. It is possible in principle to control higher viscosities in reactors of this type, which makes possible polymerization in the presence of small amounts of solvent and with high conversion. In order to achieve a reaction volume which is sufficiently large for industrial reactors, the tubular reactors are designed as tube bundle reactors. 3 variables are available for obtaining a particular reaction volume: the length of the individual tubes, their diameter and their number in the tube bundle. A large number of tubes in the tube bundle results in the problem that there is no uniform flow through all the tubes. Large diameters reduce the specific cooling area. Hence the tubes must not have less than a certain length for economic reasons. The polymerization reaction results in a radial temperature and flow rate profile forming along the individual tubes, which leads to an adverse effect on the removal of heat. In the extreme case, the attempt to achieve high space-time yields may lead to a runaway reaction.

It is an object of the present invention to develop a process and an apparatus for the preparation of polymers, in particular copolymers of vinylaromatics and acrylonitrile, in the presence of minimum amounts of solvent and with high conversion to achieve a maximum space-time yield.

SUMMARY OF THE INVENTION

We have found that an improved process is achieved by carrying out the polymerization in a recycle reactor which has at least one tube bundle reactor with straight tubes around which a liquid heat-transfer medium flows, and which is connected to at least one static mixer, and by each tube bundle reactor consisting of two heat exchangers which are connected together by at least one intermediate mixing section with static mixing elements. Moreover the volume of the shell and tube heat exchangers must be at least 50% of the total volume of the arrangement. The shell and tube heat exchangers contain at least one vigorous intermediate mixing section, which are constructed of tubes around which heat-transfer medium flows and which have incorporated static mixing elements. Moreover the number of tubes in the intermediate mixing section is at least two, but is as many as or less than the number of tubes in the shell and tube heat exchanger. The static mixing elements consist of a framework of intermeshing, mutually crossing arms as are known under the name SMX mixer from Sulzer. The relation between the number n of tubes, through which the reaction components flow, in the intermediate mixing section and the number m of tubes through which the latter flow in the shell and tube heat exchanger is $1 < n \leq m$.

These intermediate mixing sections lead to a smoothing of the radial flow and temperature profiles and thus to an improvement in the heat transfer. Static mixers can be arranged in the connecting lines between the two heat exchangers. The reaction mass is circulated by a circulating pump. The feed mixture is conveyed through a feed mixture inlet into the reactor. The reaction mass is passed through an outlet from the reactor into a degassing extruder. A mixture of fresh monomers and volatile constituents returned from the degassing, which have previously been condensed, is fed into the reactor.

DESCRIPTION OF THE PREFERRED EMBODIMENTS

The process according to the invention for the preparation of thermoplastic polymers is used in particular to assemble copolymers of at least one vinylaromatic monomer a) and, where appropriate, at least one monomer b) from the group of nitriles and esters of (meth)acrylic acid of alcohols with 1 to 8 carbon atoms, and maleic anhydride. Suitable vinylaromatic monomers are: styrene, α-methylstyrene and para-methylstyrene too. Preferred copolymers which may be mentioned are the binary copolymers of styrene and acrylonitrile, of α-methylstyrene and acrylonitrile and the ternary polymers of α-methylstyrene, styrene and acrylonitrile.

Based on 100% by weight of the mixture of monomers a) and b) it is additionally possible to use solvents in a proportion of from 1 to 25% by weight, preferably 2 to 18% by weight, and up to 5% by weight of water. Suitable inert solvents are nonpolar solvents such as aromatic hydrocarbons with 6 to 12 carbon atoms, in particular benzene, toluene, ethyltoluene or ethylbenzene. Ethylbenzene is particularly preferably used.

The process according to the invention can be carried out either thermally or with use of conventional initiators, eg. of organic peroxides or organic azo compounds known to the skilled worker. These initiators are used in the concentrations familiar to the skilled worker, ie. in the range from 0.001 to 0.5% by weight, in each case based on the total of monomers a) and b). The skilled worker is aware of the form in which these initiators (as solution in monomers or in the solvent) can be metered continuously into the reactor in which the polymerization takes place.

The process according to the invention is carried out in a hydraulically filled reactor in the temperature range from 50° to 230° C., in particular at from 50° to 180° C., under a pressure in the range from 0.1 bar to 100 bar, in particular from 0.5 to 75 bar, and with average holdup times of the monomers in the reaction masses of from 20 to 420 minutes, in particular 45 to 300 minutes. The reactor, which is to be referred to as recycle reactor, has as essential constituents according to the invention at least one tube bundle reactor consisting of m tubes around which a heat-transfer medium flows, with in each case at least one intermediate mixing section which consists of tubes with static mixing elements around which a heat transfer medium flows, where the number n of tubes in the intermediate mixing section is 1 < n ≦ m, at least one static mixer in the connecting lines between the shell and tube heat exchangers, at least one feed mixture inlet, an outlet and at least one circulating pump.

The viscosity of the reaction medium can be up to 750 Pas, preferably up to 500 Pas. The flow rate in the tubes of the tube bundle reactor can be in the range from 0.5 to 20 cm/s, preferably 2 to 15 cm/s. The recycle ratio, defined as the quotient of the mass flow conveyed by the circulating pump and the mass flow of the feed, can be in the range from 5 to 125, preferably in the range from 10 to 100.

The amount discharged from the reactor corresponds to the amount fed in because the reactor is hydraulically filled. Volatile constituents are removed from the discharge by single stage or multistage evaporation until they are less than 1% by weight, based on the polymer. The volatile constituents which have been removed can be returned after condensation thereof into the reactor.

The process according to the invention and the apparatus according to the invention are described by means of examples hereinafter.

Figure 1:
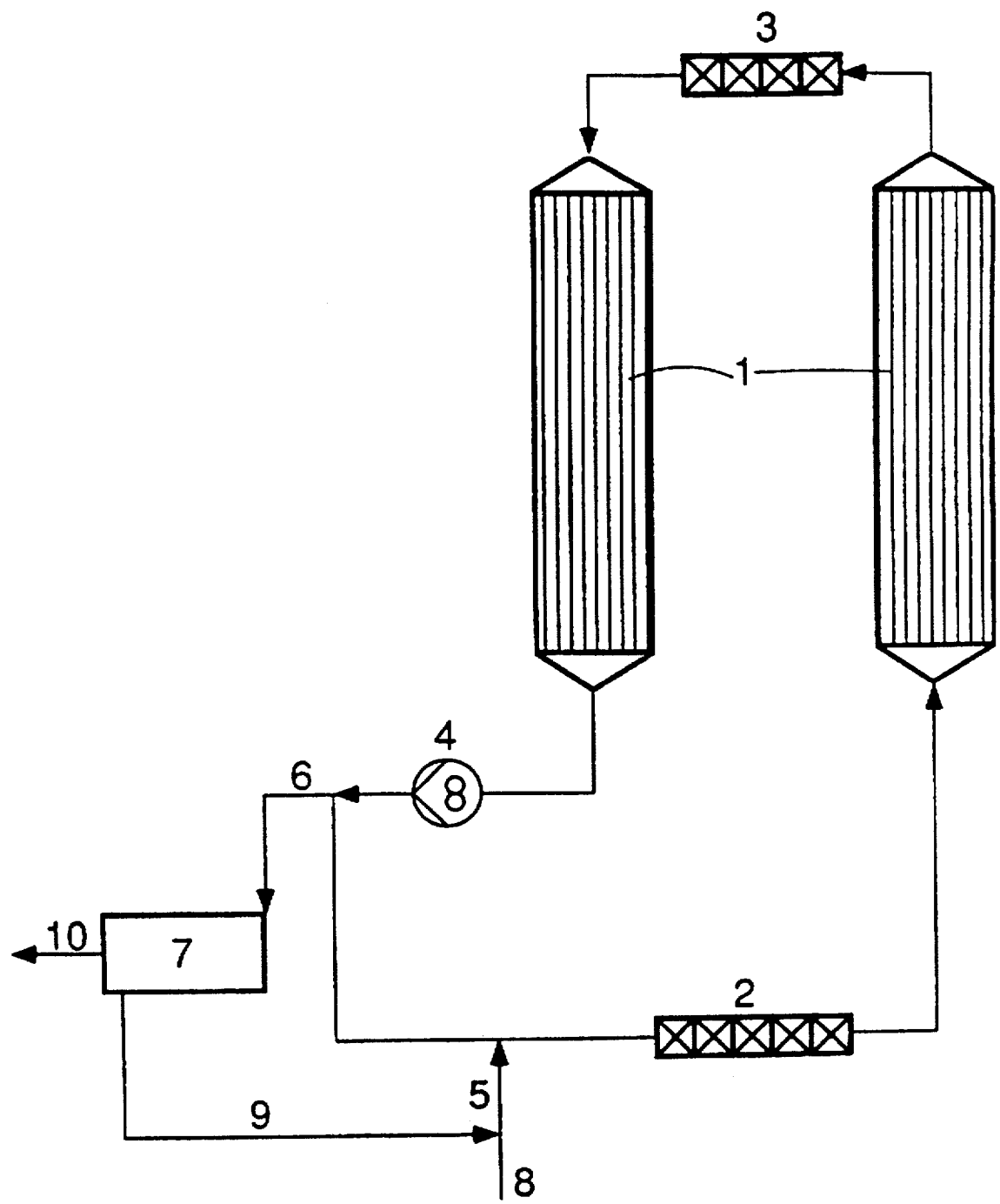
FIG. 1 shows a diagrammatic drawing of the apparatus used for carrying out the tests.
Figure 2:
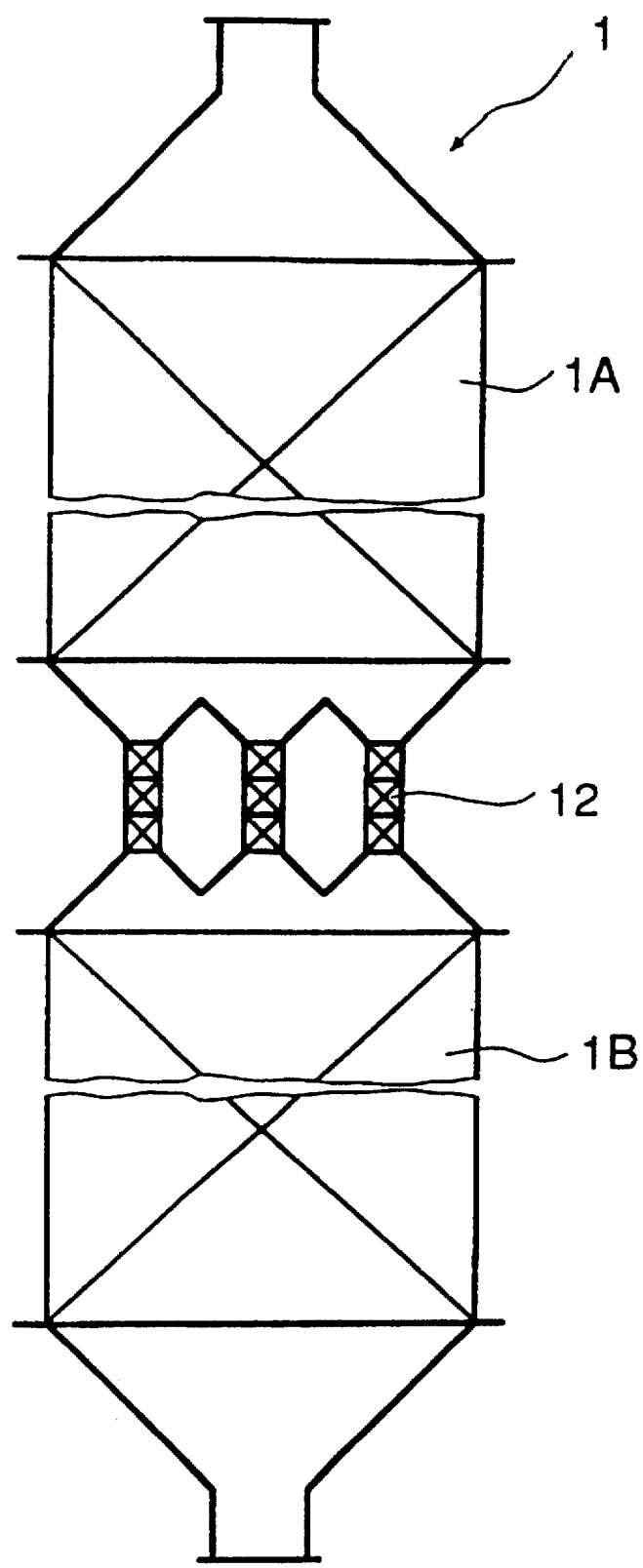
FIG. 2 shows a diagrammatic drawing of the tube bundle reactor with vigorous intermediate mixing section.

The tests were carried out in an apparatus whose design is diagrammatically depicted in FIG. 1. The tube bundle reactor 1 used in the latter is shown in FIG. 2. The recycle reactor consists of 2 tube bundle reactors 1A and 1B which are each 3 m long and are divided into two and each have 19 tubes 1 which each have an internal diameter of 30 mm. The tube bundle reactors each contain in their middle an intermediate mixing section 12 each of which is 30 cm long and consists of 5 tubes in each of which static SMX mixing elements from Sulzer are located. The mixing elements s of these SMX mixers consist of a framework of intermeshing, mutually crossing arms. SMX mixers of this type are mainly used in the laminar flow region. Liquid heat transfer medium flows around the tube bundle reactors 1A and 1B, and the intermediate mixing sections 12. Also belonging to the reactor are two static SMX mixers from Sulzer 2 and 3, a circulating pump 4, a feed mixture inlet 5, an outlet 6 and a degassing extruder 7. The total volume of the reactor is 100.

A mixture of fresh monomers which are fed through line 8 is passed into the reactor through the feed mixture inlet 5, as are volatile constituents which derive from the degassing, have been condensed and are returned through line 9. The reaction mass discharged through line 6 is fed to the vaporizer extruder 7 in which the volatile constituents are drawn off through line 9. The copolymer from the extruder 7 is discharged in the form of extrudates through line 10, and is cooled and granulated.

EXAMPLE 1

In the stationary state, a mixture of fresh monomers and of the condensed volatile constituents from the degassing extruder, from which unwanted constituents have been removed where appropriate, was fed to the polymerization system. The composition of the monomer feed pumped into the reactor was chosen so that the copolymer contained 35% by weight acrylonitrile and 65% by weight styrene. The content of ethylbenzene, based on the total reaction mass in the reactor, was 15% by weight. The recycle ratio was 45, the average holdup time was 2.5 hours and the reaction temperature was 145° C. The space-time yield was 0.17 kg/h.l.

EXAMPLE 2

As Example 1 but the reaction temperature was 155° C. The space-time yield was 0.20 kg/h.l.

EXAMPLE 3

As Example 1 but the reaction temperature was 165° C. The space-time yield was 0.22 kg/h.l.

EXAMPLE 4

As Example 1 but the reaction temperature was 170° C. and the average holdup time was 2.2 hours and the proportion of ethylbenzene was 12%. The space-time yield was 0.33 kg/h.l.

EXAMPLE 5

As Example 1 but the reaction temperature was 170° C. and the average holdup time was 1.9 hours and the proportion of ethylbenzene was 10%. The space-time yield was 0.37 kg/h.l.

COMPARATIVE EXAMPLES

The Comparative Examples were carded out in a reactor which is designed like that described above but has no vigorous intermediate mixing sections. The total volume of the reactor was also 100 l in this case.

COMPARATIVE EXAMPLE 1

Test conditions as described in Example 1. The space-time yield was to 0.16 kg/h.l.

COMPARATIVE EXAMPLE 2

Test conditions as described in Example 1 but with a reaction temperature of 170° C., an average holdup time of 2.1 hours and an ethylbenzene content of 12% by weight. The space-time yield was 0.29 kg/h.l.

COMPARATIVE EXAMPLE 3

Test conditions as described in Example 1 but with a reaction temperature of 169° C., an average holdup time of 2.4 hours and an ethylbenzene content of 12% by weight. No stationary operating state could be reached because the reaction temperature showed fluctuations of +1.5° C. The space-time yield varied between 0.31 and 0.33 kg/h.l.

COMPARATIVE EXAMPLE 4

Test conditions as described in Example 1 but with a reaction temperature of 171° C., an average holdup time of 2.3 hours and an ethylbenzene content of 11% by weight. About 5 hours after adjusting the new test conditions the reaction became uncontrollable and ran away.

Comparison of the test examples carried out by the process according to the invention with the apparatus developed therefor shows that the results achieved in this case in respect of the space-time yield are considerably better than in the comparative tests carried out by the known process.

We claim:

1. A process for the continuous preparation of polymers from reaction components by bulk or solution polymerization, where the reaction components are passed through the tubes of a recycle reactor,
wherein
the recycle reactor has at least one tube bundle reactor with straight tubes around which a liquid heat-transfer medium flows, and wherein each tube bundle reactor consists of at least two shell and tube heat exchangers which are connected together by at least one intermediate mixing section.

2. A process as defined in claim 1, wherein the volume of the shell and tube heat exchangers is at least 50% of the total volume of the arrangement.

3. A process as defined in claim 1, wherein the intermediate mixing sections consist of tubes with static mixing elements, where a heat-transfer medium flows around the tubes.

4. A process as defined in claim 1, wherein the flow in the tubes of the intermediate mixing sections is around frameworks of intermeshing, mutually crossing arms.

5. A process as defined in claim 1, wherein the relation for the number n of tubes, through which the reaction components flow, in the intermediate mixing section and the number m of tubes through which the latter flow in the shell and tube heat exchanger is $1 < n \leq m$.

6. A process as defined in claim 1, wherein the reaction components are passed between two tube bundle reactors through a static mixing elements.

7. A process as defined in claim 1, wherein mixtures of at least one vinylaromatic monomer and, optionally at least one monomer from the group of nitriles of (meth)acrylic acid and of esters of (meth)acrylic acid with alcohols with 1 to 8 carbon atoms, and maleic anhydride, are fed to the recycle reactor.

8. A process as defined in claim 7, wherein styrene, α-methylstyrene and/or para-methylstyrene are used as vinylaromatic monomers.

9. A process as defined in claim 1, wherein the solvents used in solution polymerization are aromatic hydrocarbons with 6 to 12 carbon atoms, in particular benzene, toluene, ethyltoluene or ethylbenzene.

10. A process as defined in claim 9, wherein additionally solvents in a proportion of from 1 to 25% by weight and up to 5% by weight of water are fed in based on 100% by weight of the monomer mixture.

11. A process as defined in claim 1, wherein the reaction temperature in the reactor is in the range from 50 to 230° C. and the pressure is in the range from 0.1 to 100 bar and/or wherein the average holdup time of the monomers in the reaction mass is from 20 to 420 minutes and/or wherein the flow rate of the reaction medium in the tube bundle reactor is in the range from 0.5 to 20 cm/s and/or wherein the viscosity of the reaction medium does not exceed 750 Pas and/or wherein the mass ratio of the mass flow recycled to the mass flow fed is in the range of from 5 to 125.

12. A process as defined in claim 1, wherein a copolymer of styrene and acrylonitrile is prepared.

13. A process as defined in claim 1, wherein the reaction temperature in the reactor is in the range from 50 to 180° C., and the pressure is in the range from 0.5 to 75 bar and/or wherein the average holdup time of the monomers in the reaction mass is from 45 to 300 minutes and/or wherein the flow rate of the reaction medium in the tube bundle reactor is in the range from 2 to 15 cm/s and/or wherein the viscosity of the reaction medium does not exceed 500 Pas and/or wherein the mass ratio of the mass flow recycled to the mass flow fed is in the range of from 10 to 100.

* * * * *